Oct. 19, 1926.
C. E. DORSEY
1,603,843
TOWING AND STEERING MECHANISM FOR TRACTOR TRAILERS
Original Filed May 26, 1923
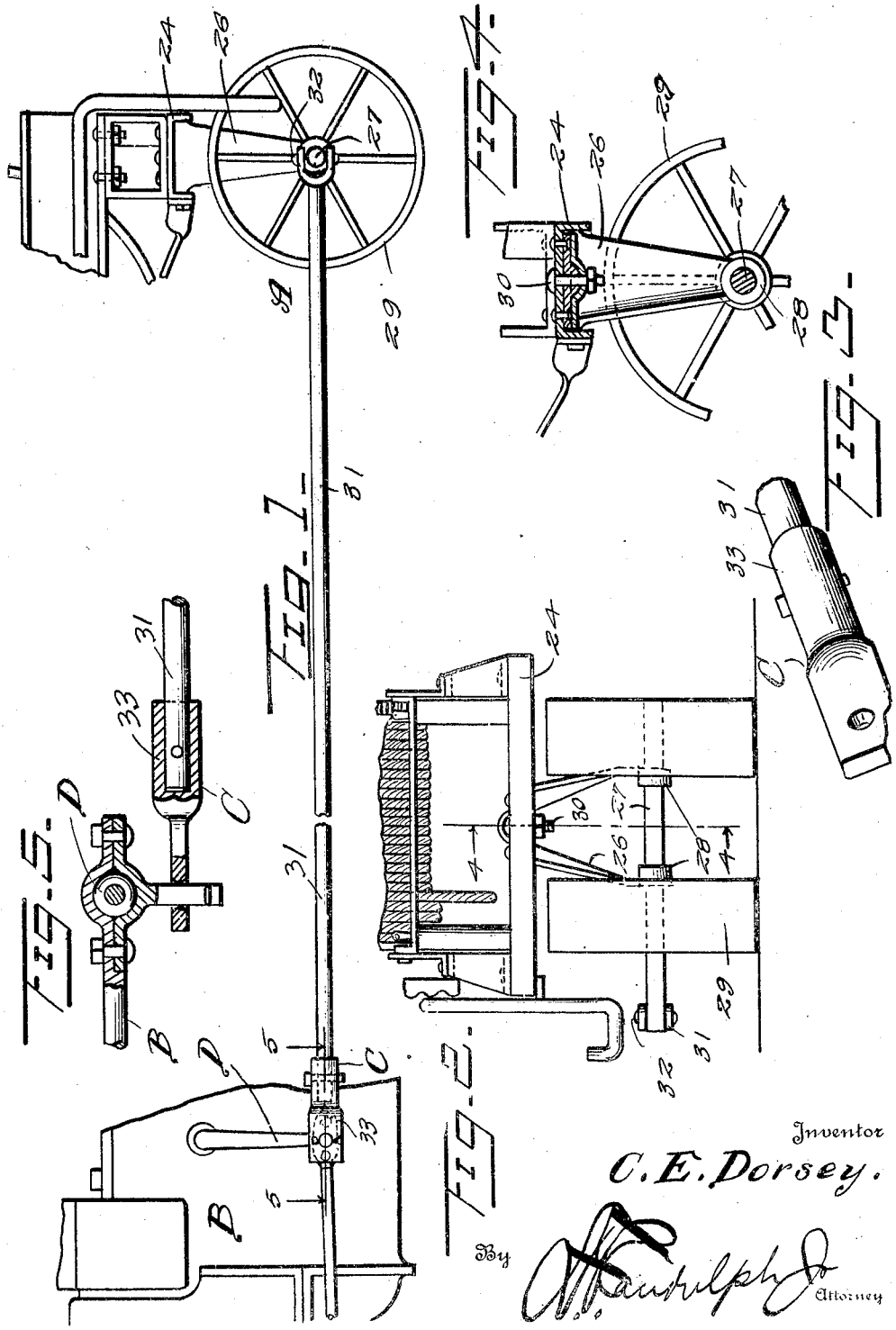
Inventor
C. E. Dorsey.

Patented Oct. 19, 1926.

1,603,843

UNITED STATES PATENT OFFICE.

CLAUDE E. DORSEY, OF ELBA, ALABAMA.

TOWING AND STEERING MECHANISM FOR TRACTOR TRAILERS.

Original application filed May 26, 1923, Serial No. 641,639. Divided and this application filed July 15, 1924. Serial No. 726,134.

This invention relates to a towing and steering mechanism for tractor trailers.

It is aimed to provide a novel, durable and efficient mechanism for the purpose mentioned which may be inexpensively manufactured and readily attached and detached.

Another object is to provide a construction wherein the steering connection is made with the rear axle or shaft on which the ground wheels of the trailer are journaled.

The more specific objects and advantages will be partly pointed out and otherwise become apparent from a consideration of the description following taken in connection with accompanying drawings illustrating an operative embodiment.

In said drawings:—

Figure 1 is a view in side elevation showing a tractor trailer equipped with my improvement and with the latter connected to steering gear of a tractor, the latter being shown fragmentarily;

Figure 2 is a rear view showing the apparatus in connection with the trailer;

Figure 3 is a detail perspective view of the connection between the steering bar and the tractor steering mechanism, Figure 4 is a cross sectional view taken on the line 4—4 of Figure 2, and Fig. 5 is a cross section on the line 5—5 of Figure 1.

The present invention constitutes a division of my application, Serial No. 641,639, filed May 26, 1923, for a skidder and hoisting attachment for tractors.

At A, a trailer is shown which while conventional, specifically is that disclosed as a skidder and hoisting attachment in my said application, 641,639. B represents a conventional tractor to which the attachment A is detachably connected at C. Parts of the steering gear of said tractor are designated D.

Specific reference to the parts of the attachment will be omitted as forming no part of the present invention. However, those parts thereof which do constitute elements of the present invention will now be referred to. A steering frame generally of arch shape is utilized at 26. This frame 26 has an axle 27 journaled in bearings 28 depending therefrom. Ground wheels 29 are suitably journaled on shaft 27 and a king pin 30 rises from frame 26 and is journaled in a plate 24 of the attachment frame. An elongated steering rod 31 is pivotally connected to one of the free ends of the axle 27 as by a vertical pin 32. At its forward end, steering rod 31 has a clamp 33 which is adapted for connection, as shown in Figure 1, to a suitable part of the steering gear of the tractor, to the end that as the tractor is steered, corresponding movement through the medium of said rod 31 will be imparted to the shaft or axle 27 and wheels 29 journaled thereon.

It will be realized that the attachment and the steering rod 31 may be readily attached to or detached from the tractor and that the rod 31 in effect forms part of the steering gear of the tractor, that is operates through the movement of the latter, in order to steer the wheels 29.

Changes may be resorted to provided they fall within the spirit and scope of the invention.

I claim as my invention:—

1. An attachment of the class described having ground wheel means adapted to be steered, and a connection to steer said ground wheel means attachable to the ground wheel means and to the steering gear of a tractor, said connection being disposed at one side of the attachments and tractor and being rigid from one zone of connection to the other.

2. An attachment of the class described having ground wheels means, an axle therefor, means extending directly and from adjacent one end of said axle and attachable directly to the steering gear of a tractor at one side of the latter to move said axle with said steering gear, means mounting said axle, the latter means being pivoted to the attachment, and the second mentioned means being rigid from said axle to the attachment.

3. An attachment of the class described having ground wheel means, an axle therefor, a bearing for said axle, a plate, a king pin on the bearing journaled in said plate so that the bearing may turn relatively to the attachment, a rigid steering rod extending directly from one end of the axle and attachable directly to the steering gear of a tractor, said steering rod being disposed at one side of the tractor.

In testimony whereof I affix my signature.

CLAUDE E. DORSEY.